United States Patent
Gim et al.

(10) Patent No.: US 12,345,906 B2
(45) Date of Patent: Jul. 1, 2025

(54) LIGHT MODULATION DEVICE

(71) Applicant: LG Chem, Ltd., Seoul (KR)

(72) Inventors: Min Jun Gim, Daejeon (KR); Sergey Belyaev, Daejeon (KR); Jung Sun You, Daejeon (KR); Cheol Ock Song, Daejeon (KR); Dong Hyun Oh, Daejeon (KR); Cheol Min Yun, Daejeon (KR); Jin Hong Kim, Daejeon (KR); Jung Woon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 713 days.

(21) Appl. No.: 17/636,557

(22) PCT Filed: Oct. 22, 2020

(86) PCT No.: PCT/KR2020/014538
§ 371 (c)(1),
(2) Date: Feb. 18, 2022

(87) PCT Pub. No.: WO2021/080361
PCT Pub. Date: Apr. 29, 2021

(65) Prior Publication Data
US 2022/0299690 A1    Sep. 22, 2022

(30) Foreign Application Priority Data
Oct. 25, 2019   (KR) .......................... 10-2019-0133731

(51) Int. Cl.
*G02B 5/30*       (2006.01)
(52) U.S. Cl.
CPC ........... *G02B 5/3016* (2013.01); *G02B 5/305* (2013.01)

(58) Field of Classification Search
CPC .... G02B 5/3016; G02B 5/305; G02B 27/286; G02B 5/3083; G02B 5/3025; B32B 7/023;
(Continued)

(56) References Cited

U.S. PATENT DOCUMENTS

2004/0156001 A1   8/2004  Moriya
2005/0190326 A1   9/2005  Jeon et al.
(Continued)

FOREIGN PATENT DOCUMENTS

CN   101258432 A   9/2008
CN   101424765 A   5/2009
(Continued)

OTHER PUBLICATIONS

Extended European Search Report including Written Opinion for Application No. 20879315.8 dated Nov. 28, 2022, pp. 1-8.
(Continued)

*Primary Examiner* — Cara E Rakowski
*Assistant Examiner* — Jennifer A Jones
(74) *Attorney, Agent, or Firm* — Lerner David LLP

(57) ABSTRACT

A light modulation device is disclosed herein. In some embodiments, a light modulation device includes a first polymer film substrate having a first surface and a second surface, an adhesive layer or pressure-sensitive adhesive layer disposed on the first surface of the first polymer film substrate, a second polymer film substrate having a first surface and a second surface, a liquid crystal alignment film disposed on the first surface of the second polymer film substrate, a −C plate; and a light modulation layer containing a liquid crystal compound. The light modulation device has excellent optical properties including transmittance-variable characteristics through characteristic control and proper arrangement of a compensation film, and being applicable to
(Continued)

various uses by controlling inclination angle light leakage in a black mode.

16 Claims, 7 Drawing Sheets

(58) Field of Classification Search
CPC ....... B32B 7/12; B32B 27/06; B32B 2305/55; G02F 1/13718; G02F 1/13363; G02F 2413/00

See application file for complete search history.

(56) References Cited

U.S. PATENT DOCUMENTS

| | | | |
|---|---|---|---|
| 2006/0103798 A1 | 5/2006 | Jang et al. | |
| 2006/0209246 A1* | 9/2006 | Kim | G02F 1/133377 349/155 |
| 2007/0097305 A1* | 5/2007 | Lin | G02F 1/141 349/141 |
| 2007/0279553 A1 | 12/2007 | Yoda et al. | |
| 2008/0284948 A1* | 11/2008 | Koishi | G02F 1/13363 359/489.07 |
| 2009/0115958 A1* | 5/2009 | Kurihara | G02F 1/13718 349/179 |
| 2009/0122243 A1* | 5/2009 | Sugiyama | G02B 5/3083 349/141 |
| 2009/0153756 A1* | 6/2009 | Roberts | G02F 1/13718 349/190 |
| 2015/0168778 A1 | 6/2015 | Shin | |
| 2018/0074377 A1 | 3/2018 | You et al. | |
| 2018/0284536 A1 | 10/2018 | Lee et al. | |
| 2019/0162991 A1* | 5/2019 | Hagiwara | G02F 1/1335 |
| 2019/0384094 A1 | 12/2019 | Lee et al. | |
| 2020/0019008 A1 | 1/2020 | Jeon et al. | |

FOREIGN PATENT DOCUMENTS

| | | |
|---|---|---|
| CN | 107430301 A | 12/2017 |
| CN | 107924077 A | 4/2018 |
| CN | 108885362 A | 11/2018 |
| CN | 110325890 A | 10/2019 |
| EP | 1930750 A1 | 6/2008 |
| JP | 2004-240102 A | 8/2004 |
| JP | 2004235405 A | 8/2004 |
| JP | 2006513459 A | 4/2006 |
| JP | 2007279656 A | 10/2007 |
| JP | 2008033222 A | 2/2008 |
| JP | 2014-235405 A | 12/2014 |
| JP | 2015-168778 A | 9/2015 |
| JP | 2017198749 A | 11/2017 |
| JP | 2018507443 A | 3/2018 |
| JP | 2018054887 A | 4/2018 |
| KR | 20060052389 A | 5/2006 |
| KR | 101040643 B1 | 6/2011 |
| KR | 20120120848 A | 11/2012 |
| KR | 20160146566 A | 12/2016 |
| KR | 20180119520 A | 11/2018 |
| KR | 20180121425 A | 11/2018 |
| TW | 200606475 A | 2/2006 |
| TW | 200619702 A | 6/2006 |
| TW | 200643571 A | 12/2006 |
| TW | 200815875 A | 4/2008 |
| WO | 2008117347 A1 | 10/2008 |
| WO | 2017203809 A1 | 11/2017 |
| WO | 2018199716 A1 | 11/2018 |
| WO | 2018199720 A1 | 11/2018 |

OTHER PUBLICATIONS

International Search Report for Application No. PCT/KR2020/014538 mailed Jan. 27, 2021, 2 pages.

* cited by examiner

[Figure 1]
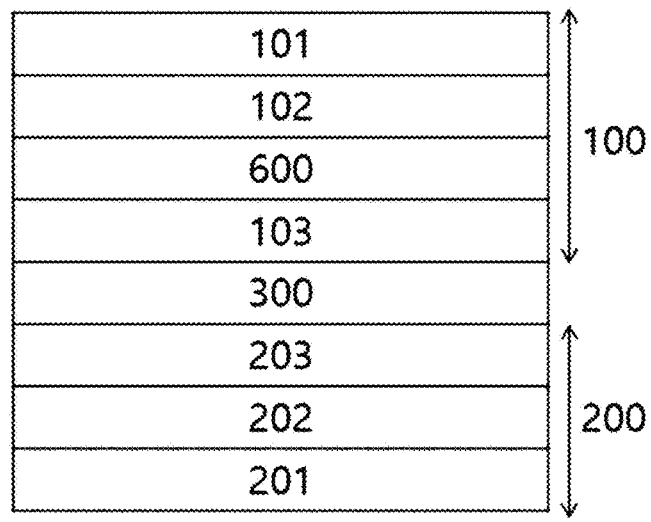
[Figure 2]
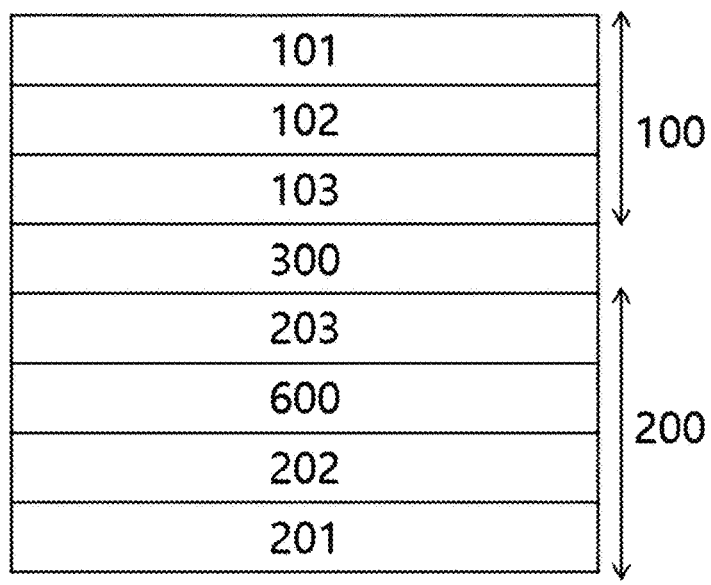

[Figure 3]
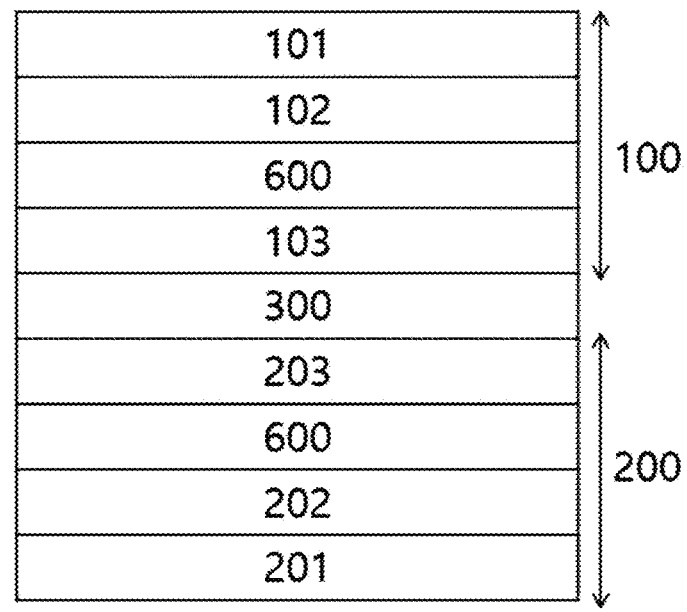
[Figure 4]
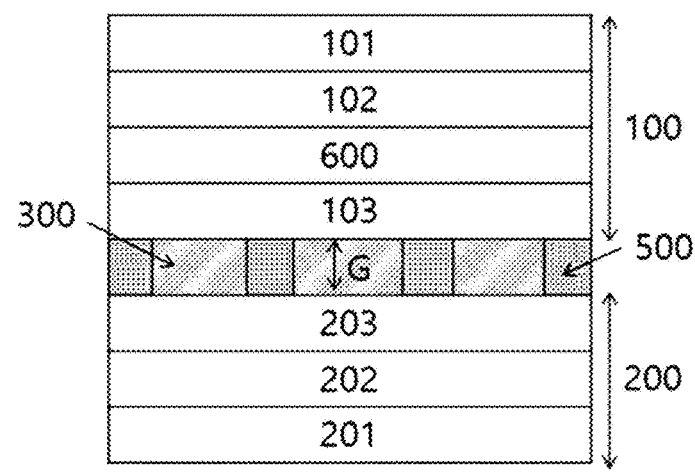

[Figure 5]
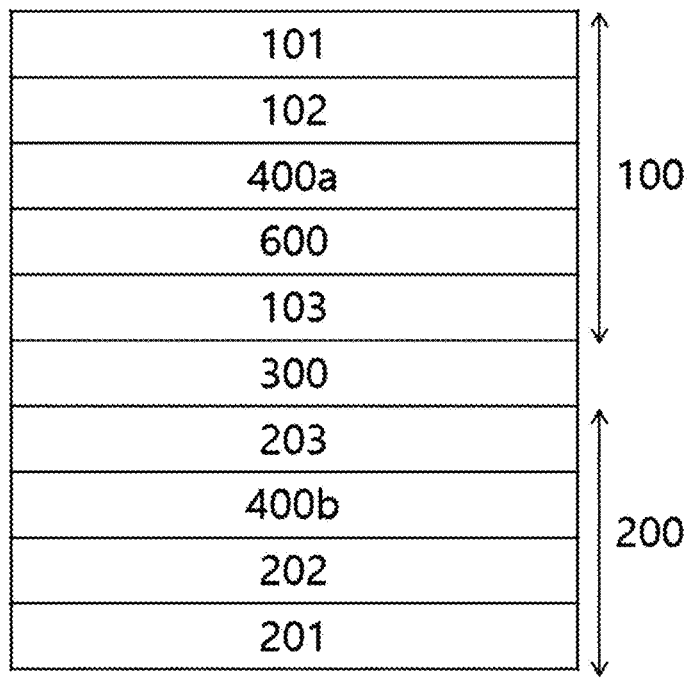
[Figure 6]
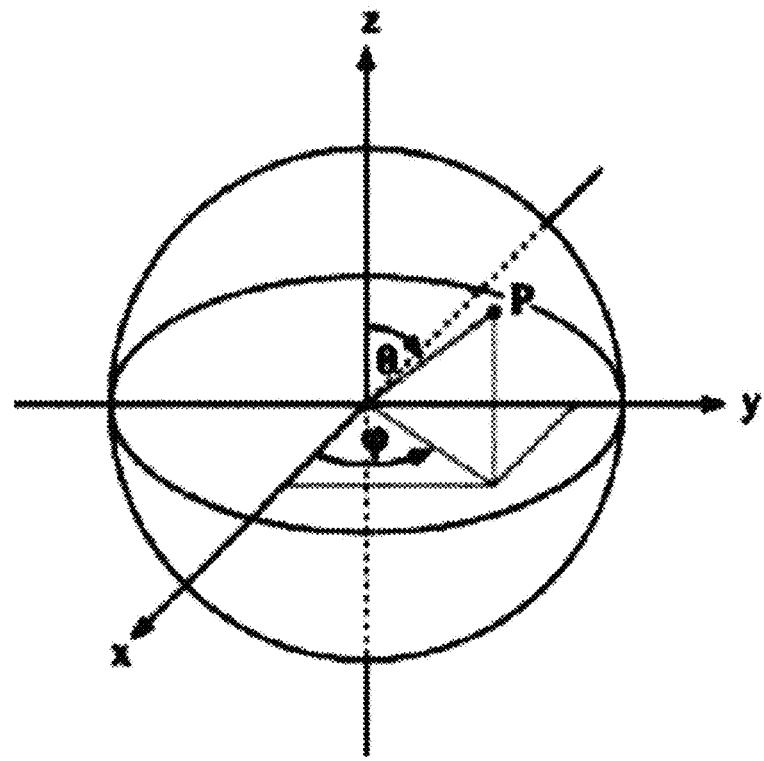

[Figure 7]
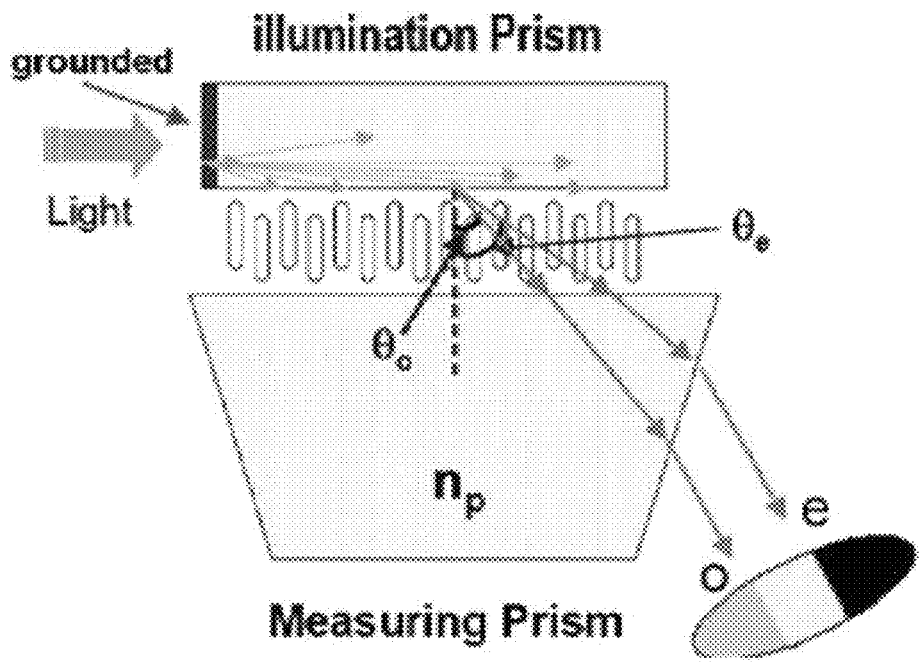
[Figure 8]
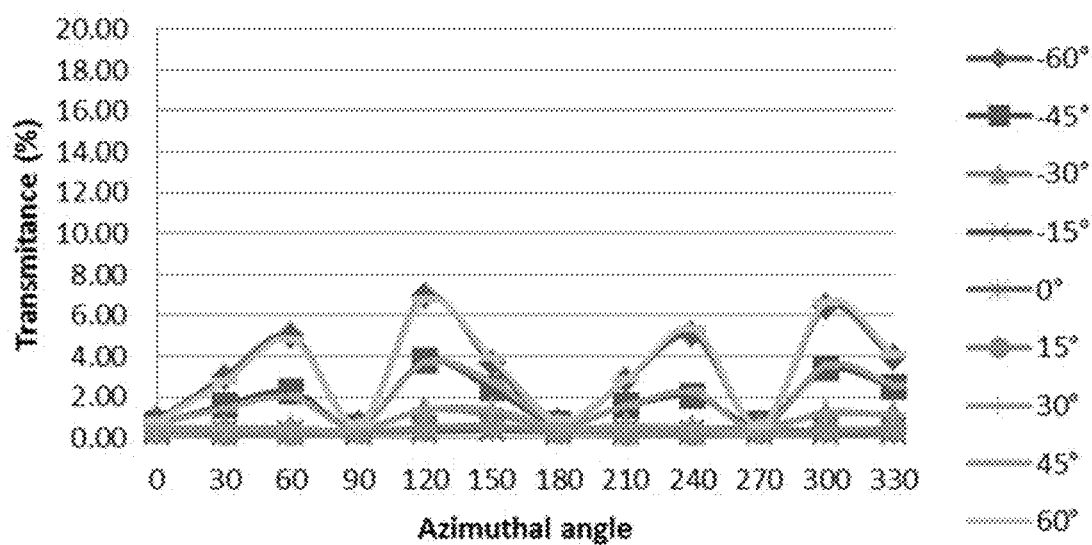

[Figure 9]
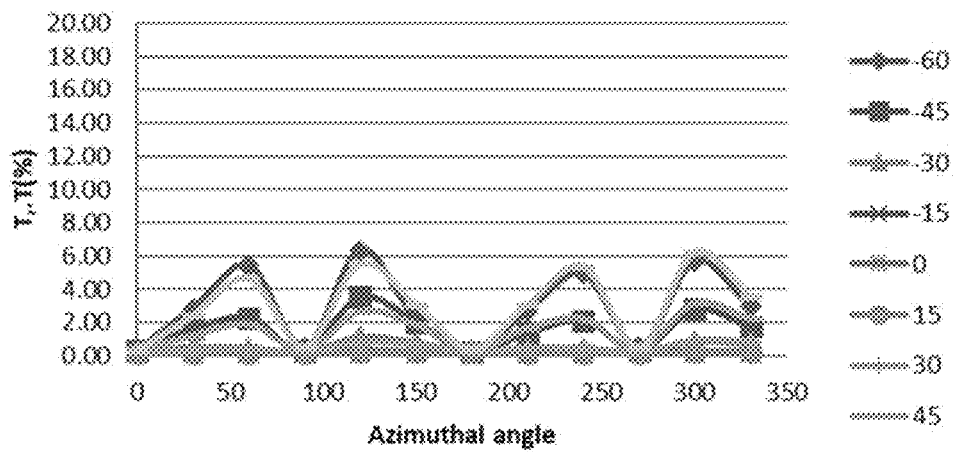
[Figure 10]
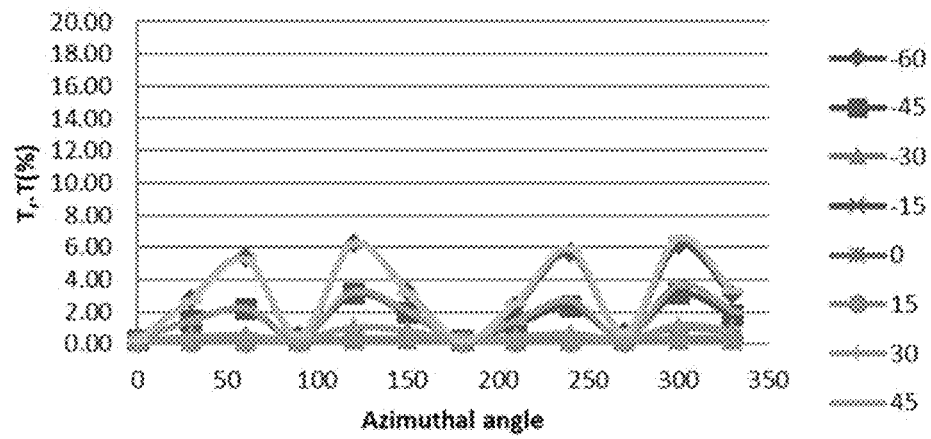
[Figure 11]
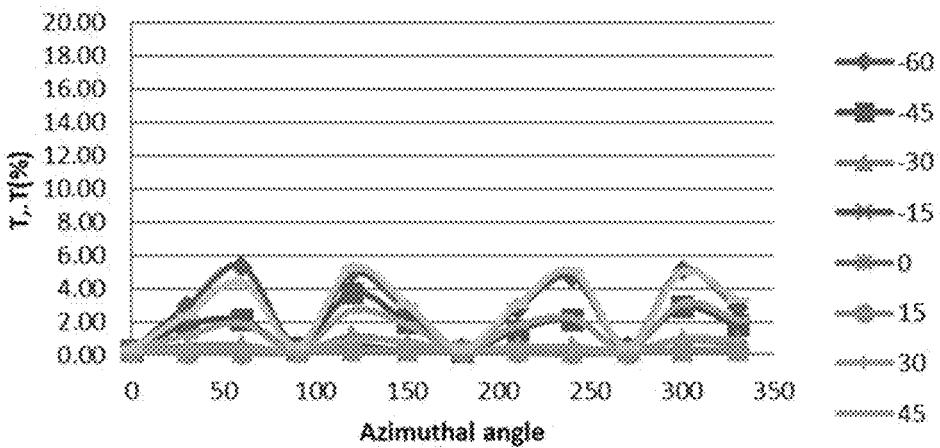

[Figure 12]
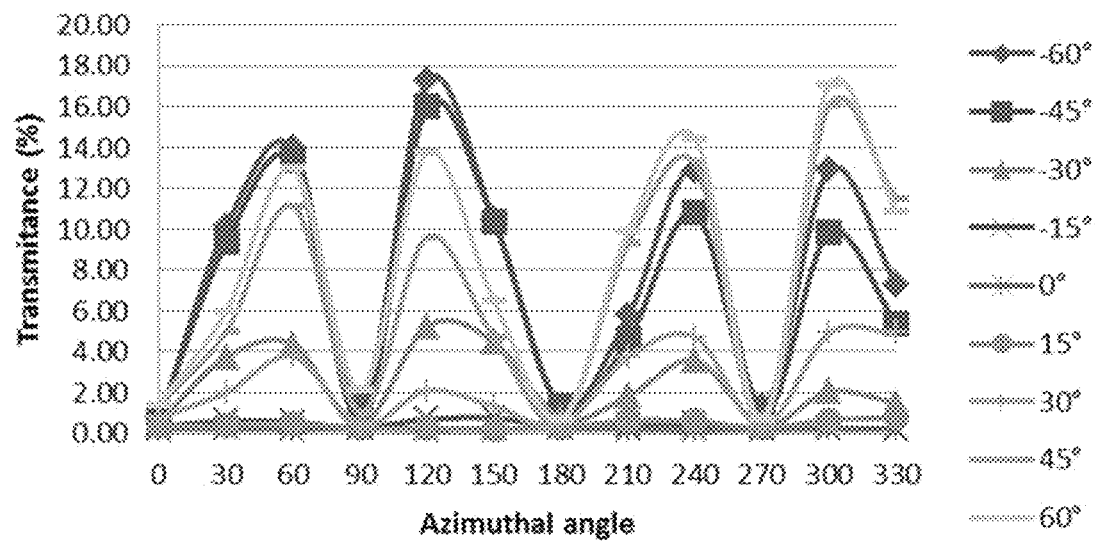
[Figure 13]
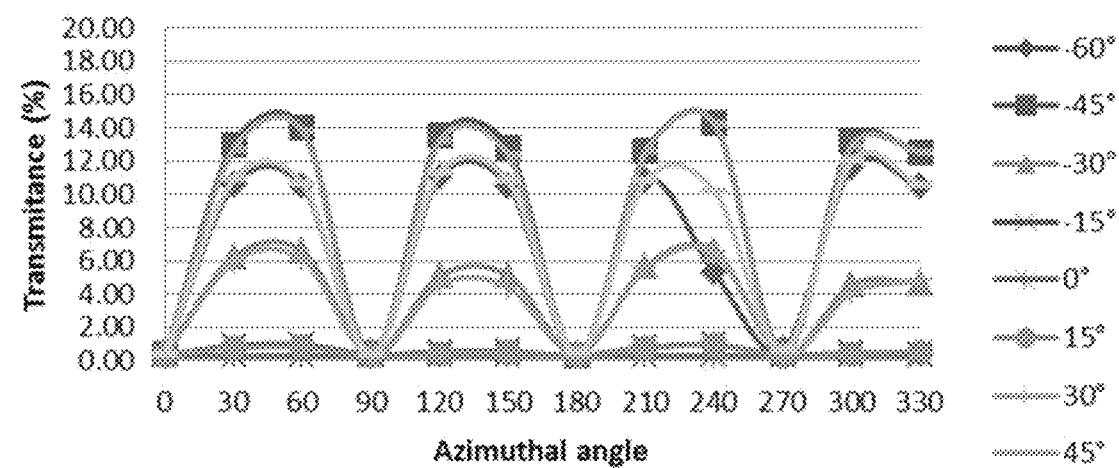

[Figure 14]
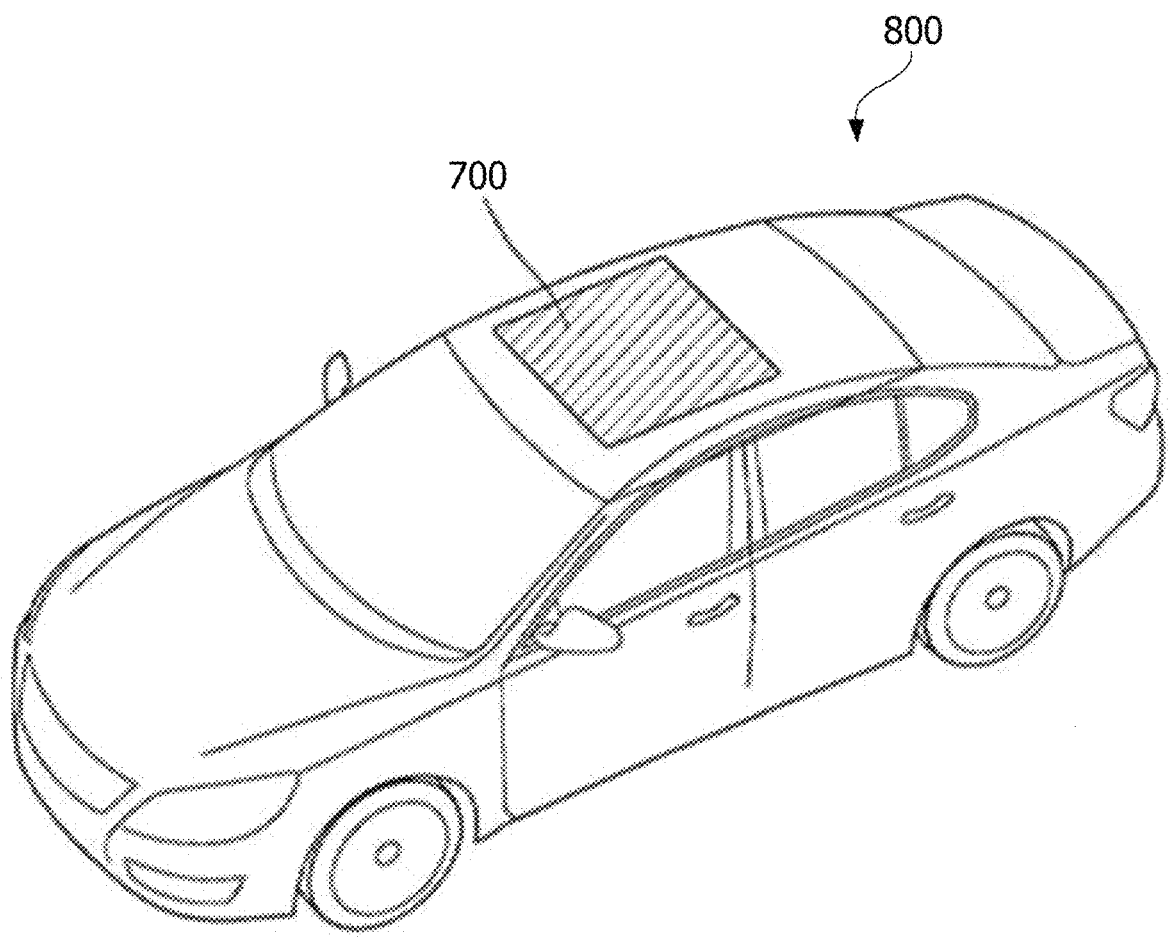

LIGHT MODULATION DEVICE

CROSS-REFERENCE TO RELATED APPLICATIONS

This application is a national phase entry under 35 U.S.C. § 371 of International Application No. PCT/KR2020/014538, filed Oct. 22, 2020, which claims priority from Korean Patent Application No. 10-2019-0133731, filed on Oct. 25, 2019, the disclosures of which are incorporated by reference herein.

TECHNICAL FIELD

The present application relates to a light modulation device.

BACKGROUND ART

A light modulation device means a device capable of switching between at least two or more different states. Such devices are used for, for example, wearable devices, such as eyewear of glasses or sunglasses, and the like, mobile devices, devices for virtual reality (VR) and devices for augmented reality (AR), or vehicle sunroofs, and the like, the uses of which are gradually expanded.

A light modulation device generally has a structure comprising a light modulation film layer and a polarization layer disposed on one side or both sides of the light modulation film layer, wherein the light modulation film layer may comprise an oppositely disposed two-layered substrate and a light modulation layer positioned at the inter-substrate.

Conventionally, an inorganic substrate such as a glass substrate has been applied as the substrate, but recently, attempts have been made to apply a polymer film as the substrate in consideration of application to various uses as described above. However, the isotropic polymer film has a problem that the mechanical strength of the film is weak during the manufacturing process, and cracks occur or shrinkage due to heat easily occurs.

Accordingly, there is an attempt to solve the above problem by applying an anisotropic polymer film as the substrate. However, the anisotropic polymer film has a problem of driving performance of the device by the phase difference of the film, for example, light leakage to the side of the light modulation device.

DESCRIPTION OF DRAWINGS

FIGS. 1 to 5 are schematic diagrams of exemplary light modulation devices of the present application.

FIG. 6 is a schematic diagram for explaining an inclination angle and a radial angle.

FIG. 7 is a diagram showing a method for evaluating refractive index anisotropy.

FIGS. 8 to 11 are graphs showing the results of measuring the transmittance of the front and inclination angles in the black mode for the light modulation devices of Examples 1 to 4.

FIGS. 12 and 13 are graphs showing the results of measuring the transmittance of the front and inclination angles in the black mode for the light modulation devices of Comparative Examples 1 and 2.

FIG. 14 is a schematic diagram of an exemplary vehicle containing an exemplary light modulation device of the present application mounted therein.

EXPLANATION OF REFERENCE NUMERALS 100, 200: first substrate, second substrate
101, 201: first and second polarization layers
102, 202: first and second polymer film substrates
103: adhesive layer or pressure-sensitive adhesive layer
203: liquid crystal alignment film
300: light modulation layer
400a, 400b: conductive layer
500: spacer
600: −C plate
700: light modulation device
800: vehicle
G: cell gap

DISCLOSURE

Technical Problem

The present application relates to a light modulation device. It is one object of the present application to provide a light modulation device, in which omnidirectional light leakage is controlled in a black mode or the like while having excellent optical characteristics such as transmittance-variable characteristics, mechanical properties and the like are excellent and occurrence of cracks and the like is prevented, thereby being applicable to various uses.

Technical Solution

The angle defined in this specification should be understood in consideration of an error such as a manufacturing error or a variation. For example, in this specification, the term vertical, parallel, orthogonal, horizontal or any numerical value, and the like means substantially vertical, parallel, orthogonal, horizontal or any numerical value in a range that does not impair the purpose and effect, and for example, each case may include an error within about ±10 degrees, an error within about ±5 degrees, an error within about ±3 degrees, an error within about ±2 degrees, an error within about ±1 degree or an error within about ±0.5 degrees.

Among physical properties mentioned in this specification, when the measurement temperature affects the relevant physical property, the physical property is a physical property measured at room temperature, unless otherwise specified.

In this specification, the term room temperature is a temperature in a state that is not particularly warmed or decreased, which may mean any one temperature in a range of about 10° C. to 30° C., for example, a temperature of about 15° C. or more, 18° C. or more, 20° C. or more, or about 23° C. or more, and about 27° C. or less. In addition, unless otherwise specified, the unit of temperature referred to in this specification is ° C.

In this specification, the planar phase difference ($R_{in}$) may mean a value calculated by Equation 1 below, and the thickness direction phase difference ($R_{th}$) may mean a value calculated by Equation 2 below.

$$R_{in} = d \times (n_x - n_y) \quad \text{[Equation 1]}$$

$$R_{th} = d \times (n_z - n_y) \quad \text{[Equation 2]}$$

In Equations 1 and 2, $R_{in}$ may be a planar phase difference, $R_{th}$ may be a thickness direction phase difference, d may be a thickness of a layer, $n_x$ may be the refractive index of the layer in the slow axis direction, and $n_y$ may be the refractive index in the planar direction orthogonal to the slow axis direction as the refractive index of the layer in the fast axis direction, and $n_z$ may be the refractive index of the layer in the thickness direction.

Here, the term layer is a layer of a measurement object for the planar phase difference and/or the thickness direction phase difference. For example, the layer may be a polarization layer, a polymer film substrate, a light modulation layer, a –C plate, an adhesive layer (or a pressure-sensitive adhesive layer) or a liquid crystal alignment film, and the like.

The term inclination angle mentioned in this specification is defined as follows, unless otherwise specified. In FIG. 6, when the plane formed by the x-axis and y-axis is a reference plane (for example, the reference plane may be a surface of a polarization layer, a polymer film substrate, a light modulation layer, a –C plate, an adhesive layer (or a pressure-sensitive adhesive layer) or a liquid crystal alignment film, and the like in a light modulation device), the angle formed as in FIG. 6 with respect to the z-axis, which is the normal of the reference plane, is defined as an inclination angle (in FIG. 6, the inclination angle at point P is Θ). In FIG. 6, when the plane formed by the x-axis and y-axis is a reference plane (for example, the reference plane may be a surface of a polarization layer, a polymer film substrate, a light modulation layer, a –C plate, an adhesive layer (or a pressure-sensitive adhesive layer) or a liquid crystal alignment film, and the like in a light modulation device) and then the x-axis of the reference plane is set to 0 degrees, the angle formed as in FIG. 6 with respect to the relevant x-axis is defined as a radial angle (in FIG. 6, the radial angle at point P is Φ). Here, the x-axis of the reference plane may mean, for example, the axis in the horizontal direction of the reference plane.

The phase difference, refractive index, refractive index anisotropy, and the like mentioned in this specification are physical quantities for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The light modulation device of the present application may comprise a light modulation film layer in which a first substrate, a light modulation layer and a second substrate are sequentially formed. For example, the first substrate may be a first polymer film substrate that an adhesive layer or a pressure-sensitive adhesive layer is formed on the first surface, and the second substrate may be a second polymer film substrate that a liquid crystal alignment film is formed on the first surface. A polarization layer may be attached to the second surface of the first substrate and/or the second surface of the second substrate.

In this specification, for convenience, the polarization layer that may be attached to the second surface of the first substrate may be referred to as a first polarization layer, and the polarization layer that may be attached to the second surface of the second substrate may be referred to as a second polarization layer.

In this specification, the first surface of the substrate means any one surface of the main surface of the substrate and the opposite surface, and the second surface means the other surface of the main surface of the substrate and the opposite surface.

The first and second polymer film substrates may be disposed so that their first surfaces face each other.

The light modulation device of the present application may comprise, for example, a –C plate in at least one of positions between the light modulation layer and the first polymer film and/or between the light modulation layer and the second polymer film substrate. Specifically, the –C plate may be present between the pressure-sensitive adhesive layer or adhesive layer and the first polymer film substrate, between the pressure-sensitive adhesive layer or adhesive layer and the light modulation layer, between the liquid crystal alignment film and the second polymer film substrate, or between the liquid crystal alignment film and the light modulation layer. The –C plate may be present in only any one of the aforementioned positions, or may be present in two or more positions. In this specification, the term –C plate is a film having different refractive indices in the thickness direction (z-axis), which means a layer that satisfies the refractive index relationship of nx=ny>nz or nx>ny>nz. Here, nx is a refractive index of a layer in a slow axis direction, ny is a refractive index in a fast axis direction, and nz is the refractive index in the normal direction of the plane formed by the slow axis and the fast axis. When the –C plate satisfies the relationship of nx>ny>nz, the planar phase difference may be about 30 nm or less, about 25 nm or less, about 20 nm or less, about 15 nm or less, about 10 nm or less, about 5 nm or less, about 4 nm or less, about 3 nm or less, about 2 nm or less or about 1 nm or less, or may be greater than 0 nm.

In one example, the light modulation device of the present application may comprise, as shown in FIG. 1, a first substrate (100) in which a first polarization layer (101), a first polymer film substrate (102), a –C plate (600) and a pressure-sensitive adhesive layer or adhesive layer (103) are sequentially formed, a light modulation layer (300), and a second substrate (200) in which a liquid crystal alignment film (203), a second polymer film substrate (202) and a second polarization layer (201) are sequentially formed.

In another example, the light modulation device of the present application may comprise, as shown in FIG. 2, a first substrate (100) in which a first polarization layer (101), a first polymer film substrate (102) and a pressure-sensitive adhesive layer or adhesive layer (103) are sequentially formed, a light modulation layer (300), and a second substrate (200) in which a liquid crystal alignment film (203), a –C plate (600), a second polymer film substrate (202) and a second polarization layer (201) are sequentially formed.

In another example, the light modulation device of the present application may comprise, as shown in FIG. 3, a first substrate (100) in which a first polarization layer (101), a first polymer film substrate (102), a –C plate (600) and a pressure-sensitive adhesive layer or adhesive layer (103) are sequentially formed, a light modulation layer (300), and a second substrate (200) in which a liquid crystal alignment film (203), a –C plate (600), a second polymer film substrate (202) and a second polarization layer (201) are sequentially formed.

In the structures of FIGS. 1 to 3, any one of the first polarization layer (101) and the second polarization layer (201) may also be omitted.

The present inventors have confirmed that light leakage upon side observation capable of occurring in the light modulation device can be prevented by appropriately arranging a compensation film, for example, the −C plate on the first substrate and/or the second substrate in the above-described position, as described above, and controlling the characteristics to be described below.

In the present application, for example, the −C plate may have an absolute value (C) of the thickness direction phase difference satisfying Condition 1 below. Here, the thickness direction phase difference of the −C plate may be a negative value.

$$C \leq D \times 1.2 \quad \text{[Condition 1]}$$

In Condition 1, D may mean a value of the thickness direction phase difference of the light modulation layer upon vertical orientation×(average refractive index of the liquid crystal compound included in the light modulation layer/average refractive index of the −C plate). Here, for example, in order to solve the problem that light leakage occurs while the phase difference of the light modulation layer is expressed when the light modulation device of the present application is viewed from an inclination angle, a compensation film, for example, a −C plate may offset the phase difference and the like of the light modulation layer, and for this, Condition 1 above may be related to controlling characteristics of the −C plate. In another example, C of Condition 1 above may be $D \times 1.19$ or less, $D \times 1.18$ or less, $D \times 1.17$ or less, $D \times 1.16$ or less, $D \times 1.15$ or less, $D \times 1.14$ or less, $D \times 1.13$ or less, $D \times 1.12$ or less, $D \times 1.11$ or less, $D \times 1.10$ or less, $D \times 1.09$ or less, $D \times 1.08$ or less, $D \times 1.07$ or less, $D \times 1.06$ or less, $D \times 1.05$ or less, $D \times 1.04$ or less, $D \times 1.03$ or less, $D \times 1.02$ or less, or $D \times 1.01$ or less, or may be $D \times 0.1$ or more, $D \times 0.2$ or more, $D \times 0.3$ or more, $D \times 0.4$ or more, $D \times 0.5$ or more, $D \times 0.6$ or more, $D \times 0.7$ or more, $D \times 0.8$ or more, or $D \times 0.9$ or more. The characteristics of the −C plate and the light modulation layer may be designed to satisfy Condition 1 above in consideration of, for example, light leakage in a black mode and/or inclination angle color change in a transparent mode, and the like.

Here, the vertical orientation of the light modulation layer may be initial orientation of the light modulation layer, as described below. Also, here, the average refractive index of the liquid crystal compound included in the light modulation layer may be measured by the method of Evaluation Example 4 below.

The absolute value (C) of the thickness direction phase difference of the −C plate, which is C of Condition 1 above, may be in a range of, for example, 100 nm to 950 nm. In another example, the range may be 150 nm or more, 200 nm or more, 250 nm or more, 300 nm or more, 350 nm or more, 400 nm or more, 450 nm or more, 500 nm or more, 550 nm or more, 600 nm or more, 650 nm or more, or 700 nm or more, or may also be 900 nm or less, 850 nm or less, 800 nm or less, 750 nm or less, 700 nm or less, 650 nm or less, 600 nm or less, or 550 nm or less or so. When one layer of the −C plate is introduced as in FIG. 1 or 2, C of Condition 1 may be the absolute value of the thickness direction phase difference of the one-layered −C plate, and when two layers are introduced as in FIG. 3 or three or more layers are introduced, it may mean the absolute value of the sum of the thickness direction phase difference of the entire −C plate.

In the present application, the −C plate may be formed by, for example, blending polyamide in a solvent, but may be used without limitation as long as it has the above-described characteristics. In one example, the polyamide may be formed by polymerizing 2,2′-bis(trifluoromethyl)-5,5′-biphenyldiamine with isophthalic acid and/or terephthalic acid. Also, in one example, the solvent may be dimethylacetamide. The polyamide may be included, for example, in a range of approximately 4 wt % to 10 wt % relative to the solvent, and in another example, it may be included in the range of 4.5 wt % or more, or 5 wt % or more, or may be included in the range of 9 wt % or less, 8 wt % or less, 7 wt % or less, 6 wt % or less, or 5.5 wt % or less.

In one example, it may be coated by applying the solution formed by blending polyamide in a solvent on a polymer film substrate or a conductive layer and coated, for example, by a bar coating method. The −C plate layer formed by the coating may be cured by thermal curing or ultraviolet curing, and the like.

In the present application, the −C plate may have a thickness after curing in a range of, for example, 1 μm to 15 μm. In another example, it may be 2 μm or more, 3 μm or more, 4 μm or more, or 5 μm or more, or may be 14 μm or less, 13 μm or less, 12 μm or less, 11 μm or less, 10 μm or less, 9 μm or less, 8 μm or less, or 7 μm or less.

As described above, the thickness direction phase difference ($R_{th}$) of the light modulation layer may be derived by Equation 2.

$$R_{th} = d \times (n_z - n_y) \quad \text{[Equation 2]}$$

In Equation 2, $R_{th}$ may be the thickness direction phase difference, d may be the thickness of the layer, $n_y$ may be the refractive index of the layer in the fast axis direction, and $n_z$ may be the thickness direction refractive index of the layer. Here, d may be, for example, the thickness of the light modulation layer, and typically, it may coincide approximately with the height of a spacer. The height of the spacer can be confirmed using a measuring device (Optical profiler, Nano system, Nano View-E1000).

In the present application, the thickness direction phase difference value of the light modulation layer may be, for example, in a range of approximately 500 nm to 900 nm. In another example, it may be approximately 550 nm or more, approximately 600 nm or more, approximately 650 nm or more, approximately 700 nm or more, or approximately 750 nm or more, or may be approximately 850 nm or less, or approximately 800 nm or less.

The average refractive index of the liquid crystal compound included in the light modulation layer and the average refractive index of the −C plate can be confirmed using an Abbe refractometer, and the specific method may follow the method disclosed in Evaluation Example 4 below.

In the present application, the average refractive index of the liquid crystal compound included in the light modulation layer may be, for example, in a range of 0.5 to 3.5. In another example, it may be 1 or more, 1.1 or more, 1.2 or more, 1.3 or more, 1.4 or more, or 1.5 or more, or may be 3 or less, 2.5 or less, 2 or less, 1.9 or less, 1.8 or less, 1.7 or less, or 1.6 or less.

In the present application, the average refractive index of the −C plate may be, for example, in a range of 0.5 to 3.5. In another example, it may be 1 or more, 1.2 or more, 1.3 or more, 1.4 or more, 1.5 or more, or 1.6 or more, or may be 3 or less, 2.5 or less, 2 or less, 1.9 or less, 1.8 or less, or 1.7 or less.

In the present application, even when applying an anisotropic film substrate to be described below as the first and second polymer film substrates, by arranging the −C plate having such characteristics in an appropriate position, it is possible to solve the problem that the compensation effect is distorted by the optical properties of the anisotropic film substrate, while controlling light leakage to the side.

In the present application, the first and/or second polymer film substrates may be anisotropic. For example, each of the first and/or second polymer film substrates may have a planar phase difference of 500 nm or more for a wavelength of 550 nm. In another example, it may be 1000 nm or more, 2000 nm or more, 3000 nm or more, 4000 nm or more, 5000 nm or more, 6000 nm or more, 7000 nm or more, 8000 nm or more, 9000 nm or more, or 10000 nm or more, or may be 50000 nm or less, 40000 nm or less, 30000 nm or less, 20000 nm or less, or 15000 nm or less, without being limited thereto.

Films having a high phase difference as above are well known in the industry, and such films exhibit optically large anisotropy as well as large asymmetry properties of mechanical properties by high stretching and the like during manufacturing. A representative example of the retardation film known in the industry may include a polyester film, such as a PET (poly(ethylene terephthalate)) film, and the like.

In the present application, the effect of preventing side light leakage by appropriately introducing the above-described −C plate together with the anisotropic film substrate may be further improved according to the content of the light modulation device of the present application to be described below.

In the light modulation device of the present application, the first and second polymer film substrates may be included in the device so that the slow axes of the first and second polymer film substrates have a specific positional relationship. In one example, the slow axes of the first and second polymer film substrates may be horizontal to each other.

By arranging the first and second polymer film substrates having such a planar phase difference so that the slow axes of the polymer film substrates have the above range, it is possible to provide a light modulation device effectively controlling the omnidirectional light leakage in the black mode while exhibiting an excellent effect of varying transmittance through the combination with the −C plate and the like.

The first and/or second polymer film substrates of the present application may each comprise, for example, first and/or second polarization layers on one side of the polymer film substrate. In this specification, the polarization layer may mean an element that converts natural light or non-polarized light into polarized light. In one example, the polarization layer may be a linear polarization layer. In this specification, the linear polarization layer means a case where the selectively transmitted light is linearly polarized light vibrating in any one direction and the selectively absorbed or reflected light is linearly polarized light vibrating in a direction orthogonal to the vibration direction of the linearly polarized light. That is, the linear polarization layer may have a transmission axis and an absorption axis or a reflection axis which are orthogonal to the plane direction.

The polarization layer may be an absorbing polarization layer or a reflecting polarization layer. As the absorbing polarization layer, for example, a polarization layer in which iodine is dyed on a polymeric stretched film such as a PVA (PVA means polyvinyl alcohol in this specification) stretched film or a guest-host type polarization layer in which liquid crystals polymerized in the oriented state are set as a host and an anisotropic dye arranged according to the orientation of the liquid crystals is set as a guest may be used, without being limited thereto. As the reflecting polarization layer, for example, a reflecting polarization layer known as a DBEF (dual brightness enhancement film) or a reflecting polarization layer formed by coating a liquid crystal compound such as LLC (lyotropic liquid crystal) may be used, without being limited thereto.

In one example, the absorption axes of the first polarization layer and the second polarization layer may be disposed to be perpendicular to each other. As the light modulation device of the present application controls omnidirectional light leakage through such arrangement, especially upon a black mode, a light modulation device exhibiting excellent transmittance-variable effect while effectively implementing a dark state can be provided.

In addition, when a polarization layer is included, the absorption axis may be perpendicular or parallel to the slow axis of the polymer film substrate.

In one example, the light modulation device of the present application may have front transmittance of 60% or less, 55% or less, 50% or less, 45% or less, 40% or less, 35% or less, 30% or less, 25% or less, 20% or less, 15% or less, 10% or less, 5% or less, 4% or less, 3% or less, 2% or less, 1% or less, 0.9% or less, 0.8% or less, 0.7% or less, 0.6% or less, 0.5% or less, 0.4% or less, or 0.3% or less at the time of a black mode. In the black mode, the lower the front transmittance is, the more advantageous, whereby the lower limit of the front transmittance in the black mode state is not particularly limited, and in one example, the upper limit of the transmittance in the transparent mode state may be about 100%, and the lower limit of the front transmittance in the black mode state may be about 0%.

In one example, the light modulation device of the present application may have front transmittance of 20% or more at the time of a transparent mode, and in another example, it may be 21% or more, 22% or more, 23% or more, 24% or more, 25% or more, 30% or more, 35% or more, 40% or more, 45% or more, 50% or more, 55% or more, 60% or more, 65% or more, 70% or more, 75% or more, or 80% or more or so. The higher the front transmittance in the transparent mode is, the more advantageous, whereby the upper limit of the front transmittance in the transparent mode state is not particularly limited, and in one example, the upper limit of the front transmittance in the transparent mode state may be about 100%.

In one example, the front transmittance difference of the light modulation device of the present application in the transparent mode and black mode states may be 15% or more, 16% or more, 17% or more, 18% or more, 19% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The front transmittance may be, for example, linear light transmittance. The linear light transmittance may be a percentage of the ratio of the light transmitted in the same direction as the incident direction to the light incident on the light modulation device. For example, if the device is in the form of a film or sheet, the percentage of the light transmitted through the device in the direction parallel to the normal direction among the light incident in a direction parallel to the z-axis direction, which is the normal direction of the film or sheet surface, may be defined as the front transmittance.

The front transmittance or reflectance may be each front transmittance or reflectance for any one wavelength in the visible light region, for example, any one wavelength in a range of about 400 nm to 700 nm or about 380 nm to 780 nm, or front transmittance or reflectance for the entire visible light region, maximum or minimum front transmittance or reflectance among the front transmittance or reflectance for the entire visible light region, or an average value of the front transmittance or an average value of the reflectance in the visible region. In another example, the front transmittance may be front transmittance for light having a wavelength of about 550 nm.

In one example, the light modulation device of the present application may have a maximum value of transmittance of less than 10% at the time of the black mode. In this specification, the inclination angle transmittance may be the transmittance of the light transmitted through the measurement object parallel to the direction of the axis where the inclination angle from the z-axis direction, which is the normal direction of the reference plane of the measurement object (for example, the reference plane may be a surface of a polarization layer, a polymer film substrate, a light modulation layer, a –C plate, an adhesive layer (or a pressure-sensitive adhesive layer) or a liquid crystal alignment film, and the like in a light modulation device), is Θ, and the maximum value of the inclination angle transmittance may mean the largest value among transmittance values obtained by measuring the transmittance of light at the inclination angle Θ while varying the radial angle Φ from 0 degrees to 360 degrees. The inclination angle Θ and the radial angle Φ may be the same as in FIG. 6. In another example, it may be less than 9%, less than 8% or less than 7%, or may be 0% or more, 1% or more, 2% or more, 3% or more, 4% or more, 5% or more, or 6% or more, without being limited thereto.

In the present application, the interval between the oppositely disposed first and second polymer film substrates may be maintained by a spacer in the form of a partition. In one example, as shown in FIG. 4, a first polarization layer (101), a first polymer film substrate (102), a –C plate (600), a pressure-sensitive adhesive layer or adhesive layer (103), a light modulation layer (300), a liquid crystal alignment film (203), a second polymer film substrate (202) and a second polarization layer (201) are sequentially formed, wherein the interval (G) between the first and second polymer film substrates may be maintained with the spacers (500) in the form of a partition. At this time, the light modulation layer (300) may exist in a region where the spacer (500) does not exist.

In the present application, the shape and arrangement of the spacers may be appropriately designed, for example, within a range capable of maintaining a certain interval between the second substrate and the first substrate.

The spacer of the present application may exist so as to form sections by the partition shape, or may also exist so that two or more pillar shapes are spaced apart, but is not limited thereto. In one example, the spacer may have a tetragonal, triangular or honeycomb partition shape. In terms of effectively controlling the inclination angle light leakage in the black mode, a tetragonal partition shape may be appropriate, and a square or rectangular partition shape may be appropriate, but is not limited thereto.

In the present application, the arrangement manners of the spacers, for example, pitch, line width, height, and area ratio in the upper part or second substrate, and the like may be appropriately selected within the range without impairing the object of the present application. Here, the area ratio means the percentage of the area in which the spacers are formed relative to the total area of the first surface of the second substrate.

In this specification, the term pitch means an interval between sides that face each other or an interval between a vertex and a side that face each other, which is identified when the spacer is observed from the top. In this specification, the matter that the spacer is observed from the top means that the spacer is observed parallel to the normal direction of the surface of the polymer film substrate formed with the spacer. In one example, when the spacer has a triangular partition shape, the term pitch may mean a vertical distance between a vertex of a triangle and a side facing the vertex. In another example, when it has a tetragonal partition shape, the term pitch may mean the length of each side of the tetragon, and when the lengths of the respective sides of the tetragon are all the same (i.e., when the tetragon is a square), the same length of the side can be defined as the pitch, and when the lengths of the respective sides are not the same (for example, when the tetragon is a rectangle), the arithmetic mean of the lengths of all sides can be defined as the pitch. In another example, when the spacer has a partition shape of a honeycomb (in case of a hexagon), the term pitch may mean the interval of the facing sides of the hexagon, and when the intervals of the facing sides are all the same, the length of the same interval of the sides can be defined as the pitch, and when the respective intervals of the sides are not the same, the arithmetic mean of the lengths of all the intervals of the sides can be defined as the pitch.

In the present application, the pitch of the spacer may be, for example, 50 μm to 500 μm, and in another example, it may be 100 μm or more, 150 μm or more, 200 μm or more, 250 μm or more, 300 μm or more, or 350 μm or more, or may be 450 μm or less, 400 μm or less, or 350 μm or less.

In this specification, the term line width means a dimension identified in the direction perpendicular to the longitudinal direction of the partition when the spacer is observed from the top. The line width of the spacer may be, for example, 1 μm to 50 μm, and in another example, it may be 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, or 16 μm or more, or may be 45 μm or less, 40 μm or less, 35 μm or less, 30 μm or less, 25 μm or less, 20 μm or less, 19 μm or less, 18 μm or less, 17 μm or less, or 16 μm or less.

Also, generally, the term height of spacer approximately matches the thickness (cell gap) of the light modulation layer, and means the dimension of the spacer measured in the normal direction of the surface of the polymer film substrate as mentioned above. In the present application, the height of the spacer may be adjusted in consideration of the interval between the first substrate and the second substrate. For example, the height of the spacer may be 1 μm to 20 μm, and in another example, it may be 2 μm or more, 3 μm or more, 4 μm or more, 5 μm or more, 6 μm or more, 7 μm or more, or 8 μm or more, or may be 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, or 6 μm or less. In one example, the height of the spacer may be approximately the same as the thickness of the light modulation layer.

In this specification, when the area of the polymer film substrate is A and the area where the spacer is formed is B, the term area ratio means a value obtained by multiplying the ratio of the area (B) where the spacer is formed among the area (A) of the polymer film substrate by 100, that is, 100×B/A. In the present application, the area ratio of the spacer may be about 0.1% to 50% with respect to the first or second polymer film substrate. In the present application, as the area ratio of the spacer increases, the adhesion (or cohesion) of the first and second polymer film substrates may increase. In another example, it may be 1% or more, 2% or more, 3% or more, 4% or more, 5% or more, 6% or more, 7% or more, 8% or more, or 9% or more, or may be 45% or less, 40% or less, 35% or less, 30% or less, 25% or less, 20% or less, 15% or less, 10% or less, or 9% or less.

In the present application, the spacer may comprise, for example, a curable resin. The curable resin may be, for example, a heat-curable resin or a photocurable resin, such as an ultraviolet curable resin, but is not limited thereto. The heat-curable resin may be, for example, a silicone resin, a silicon resin, a furan resin, a polyurethane resin, an epoxy resin, an amino resin, a phenol resin, a urea resin, a polyester resin or a melamine resin, and the like, but is not limited thereto. As the ultraviolet curable resin, typically, an acrylic polymer, for example, a polyester acrylate polymer, a polystyrene acrylate polymer, an epoxy acrylate polymer, a polyurethane acrylate polymer, a polybutadiene acrylate polymer, a silicone acrylate polymer or an alkyl acrylate polymer, and the like may be used, without being limited thereto. In one example, the spacer may be formed using an acrylic polymer, more specifically a polyester-based acrylate polymer, but is not limited thereto, and in another example, it may also be formed using a silicone polymer. When the spacer is formed using a silicone polymer, the silicone polymer remaining in the concave region of the spacer may serve as a vertical alignment film, so that as described below, no additional vertical alignment film may also be used on the substrate where the spacers are present. As the silicone polymer, a known polymer having bonds of silicon and oxygen (Si—O—Si) as a main axis, for example, polydimethylsiloxane (PDMS) may be used, without being limited thereto.

By controlling the shape and/or arrangement manner of the spacers as above, the present application can provide a light modulation device in which the cell gap is properly maintained, the adhesion (or cohesion) of the upper and lower film substrates is excellent and light leakage in the black mode is also properly controlled.

In the present application, the light modulation layer is a layer comprising at least a liquid crystal compound, which may mean a liquid crystal layer capable of controlling an orientation state of the liquid crystal compound through application of an external signal or the like. The liquid crystal compound may be, for example, a nematic liquid crystal compound, a smectic liquid crystal compound or a cholesteric liquid crystal compound, and the like, and is not limited, as long as the orientation direction thereof may be changed by application of an external signal. In one example, the liquid crystal compound may be, for example, a compound without any polymerizable group or crosslinkable group, or a compound that is not polymerized or crosslinked even if it has the group, so that the orientation direction thereof may be changed by the application of an external signal.

The light modulation layer of the present application may further comprise, for example, a dichroic dye together with the liquid crystal compound. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

For example, the present application may be directed to a device designed so that by adjusting the arrangement of the liquid crystal compound in the light modulation layer, the initial orientation is vertical orientation and the vertically oriented state is capable of being changed to a horizontally oriented state by application of an external signal. Here, the initial orientation is an oriented state when no external signal is applied to the light modulation layer.

In this specification, the term vertical orientation is a state where the director of the light modulation layer or the director of the liquid crystal compound in the light modulation layer is arranged to be substantially perpendicular to the plane of the light modulation layer, and for example, the angle formed by the z-axis, which is the normal of the surface of the light modulation layer, and the director may be in a range of about 80 degrees to 100 degrees or 85 degrees to 95 degrees, or may be about 90 degrees or so. In addition, the term horizontal orientation may mean a state where the director of the light modulation layer or the director of the liquid crystal compound in the light modulation layer is arranged to be substantially parallel to the reference plane of the light modulation layer, and for example, the angle formed by the director and the reference plane of the light modulation layer may be in a range of about 0 degrees to 10 degrees or about 0 degrees to 5 degrees, or may be about 0 degrees or so.

In this specification, the term director of light modulation layer or director of liquid crystal compound may mean an optical axis or a slow axis of the light modulation layer. For example, the optical axis or the slow axis may mean a long axis direction when the liquid crystal molecules are in a rod shape, and may mean an axis in the normal direction of a discotic plane when the liquid crystal molecules are in a discotic shape, and when a plurality of liquid crystal compounds having different directors are included in the light modulation layer, it may mean a vector sum of the directors of the liquid crystal compounds.

In one example, the light modulation layer may be designed to implement a twist orientation mode. To this end, the light modulation layer may comprise a chiral dopant together with the liquid crystal compound. In this specification, the term twist orientation mode may mean a helical structure in which the directors of the liquid crystal compounds are twisted along an imaginary helical axis and simultaneously oriented to form a layer. The twist orientation mode may be implemented in the above-described vertical and/or horizontal orientation mode. For example, the vertical twist orientation mode is a layered state in which the individual liquid crystal compounds are twisted along the helical axis in a vertically oriented state and the horizontal twist orientation mode may mean a layered state in which the individual liquid crystal compounds are twisted along the helical axis in a horizontally oriented state.

In the twist orientation mode, the ratio (d/p) of the thickness (d, cell gap) to the pitch (p) in the light modulation layer may be, for example, 1 or less. When the ratio (d/p) exceeds 1, a problem such as a finger domain may occur, and thus the range may be adjusted to the above range, if possible. In another example, the ratio (d/p) may be about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, about 0.4 or less, or about 0.35 or less, or may also be about 0.1 or more, about 0.15 or more, about 0.2 or more, about 0.25 or more, about 0.3 or more, or about 0.35 or more or so. Here, the thickness (d) of the light modulation layer may have the same meaning as the cell gap in the light modulation device.

The pitch (p) of the light modulation layer in the twist orientation mode may be measured by a measuring method using a wedge cell, and specifically, it may be measured by a method described in Simple method for accurate measurement of the cholesteric pitch using a stripe-wedge Grandjean-Cano cell of D. Podolskyy, et al. (Liquid Crystals, Vol. 35, No. 7, Jul. 8, 2008, 789-791).

The light modulation layer may further comprise a so-called chiral dopant so that the light modulation layer can implement a twist mode.

The chiral dopant that can be included in the light modulation layer can be used without particular limitation as long as it can induce a desired rotation (twisting) without deteriorating the liquid crystallinity, for example, the nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, for example, chiral dopant liquid crystal S811 commercially available from Merck Co., Ltd. or BASF's LC756 may be applied.

The application ratio of the chiral dopant is not particularly limited as long as it can achieve the desired ratio (d/p). Generally, the content (wt %) of the chiral dopant is calculated by an equation of 100/(HTP (helical twisting power)× pitch (nm)), which may be selected in an appropriate ratio in consideration of the desired pitch (p).

The light modulation layer may comprise a liquid crystal compound whose dielectric constant anisotropy is negative, or the light modulation layer may exhibit the dielectric constant anisotropy mentioned above. The absolute value of the dielectric constant anisotropy can be appropriately selected in consideration of the object of the present application. The term "dielectric constant anisotropy ($\Delta\varepsilon$)" may mean a difference ($\varepsilon//-\varepsilon\perp$) between the horizontal dielectric constant ($\varepsilon//$) and the vertical dielectric constant ($\varepsilon\perp$). In this specification, the term horizontal dielectric constant ($\varepsilon//$) means a dielectric constant value measured along the direction of an electric field in a state where a voltage is applied so that the director of the liquid crystal and the direction of the electric field by the applied voltage are substantially horizontal, and the vertical dielectric constant ($\varepsilon\perp$) means a dielectric constant value measured along the direction of an electric field in a state where a voltage is applied so that the director of the liquid crystal and the direction of the electric field by the applied voltage are substantially perpendicular.

The liquid crystal layer may comprise a liquid crystal compound having refractive index anisotropy ($\Delta n$) in a range of about 0.04 to 0.15, or the liquid crystal layer may exhibit the aforementioned refractive index anisotropy. The refractive index anisotropy ($\Delta n$) referred to in the present application is a difference (ne−no) between an extraordinary refractive index (ne) and an ordinary refractive index (no), which can be confirmed using an Abbe refractometer, and the specific manner is in accordance with the method disclosed in Evaluation Example 4 below. In another example, the refractive index anisotropy ($\Delta n$) may be about 0.14 or less, 0.13 or less, 0.12 or less, 0.11 or less, or 0.1 or less, or may be 0.05 or more, 0.06 or more, 0.07 or more, 0.08 or more, or 0.09 or more.

In this specification, the term refractive index anisotropy ($\Delta n$) is the difference (ne−no) between the extraordinary refractive index (ne) and the normal refractive index (no), which can be confirmed using an Abbe refractometer. The specific manner follows the method disclosed in the following examples.

The thickness of the light modulation layer of the present application may be appropriately selected in consideration of the object of the present application. In one example, the thickness of the light modulation layer may be about 15 μm or less. By controlling the thickness in this way, a device having a large transmittance difference in the transparent mode and the black mode, that is, a device having excellent transmittance-variable characteristics can be implemented. In another example, the thickness may be about 14 μm or less, 13 μm or less, 12 μm or less, 11 μm or less, 10 μm or less, 9 μm or less, 8 μm or less, or 7 μm or less, or may be 1 μm or more, 2 μm or more, 3 μm or more, 4 μm or more, 5 μm or more, 6 μm or more, or 7 μm or more, but is not limited thereto.

By controlling the thickness as above, it is possible to implement a device having a large front transmittance difference in the transparent mode and the black mode, that is, a device having excellent transmittance-variable characteristics.

In the light modulation device of the present application, for example, an adhesive layer or a pressure-sensitive adhesive layer may be formed on one side of the first polymer film substrate. In one example, the adhesive layer or pressure-sensitive adhesive layer may comprise an adhesive or pressure-sensitive adhesive having vertical orientation force. In this specification, the term adhesive or pressure-sensitive adhesive having vertical orientation force may mean a material having both adhesion (or cohesion) and vertical orientation force to liquid crystal molecules.

In one example, the adhesive or pressure-sensitive adhesive having vertical orientation force may be formed on at least one of the surfaces of the first polymer film substrate and the surface of the second polymer film substrate. According to one example of the present application, an adhesive or pressure-sensitive adhesive having vertical orientation force may be present on one surface of the first polymer film substrate, and a liquid crystal alignment film may be formed on one side of the second polymer film substrate.

In the present application, as the adhesive or pressure-sensitive adhesive having vertical orientation force, for example, a silicone adhesive or pressure-sensitive adhesive may be used. As the silicone adhesive or pressure-sensitive adhesive, a cured product of a composition containing a curable silicone compound may be used. The type of the curable silicone compound is not particularly limited, and for example, a heat-curable silicone compound or an ultraviolet curable silicone compound may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1{}_2SiO_{2/2}$ and a siloxane unit represented by $R^1{}_2R^2SiO_{1/2}$ and a siloxane unit represented by $SiO_{4/2}$, an organopolysiloxane copolymer comprising a siloxane unit represented by $R^1{}_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_3/2$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1{}_3SiO_{1/2}$, a siloxane unit represented by $R^1{}_2HSiO_{1/2}$ and a siloxane unit represented by $SiO_{4/2}$, an organopolysiloxane copolymer comprising a siloxane unit represented by $R^1{}_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenenthyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

   [Formula 1]

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the definition of Formula 1, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula (2) may be used.

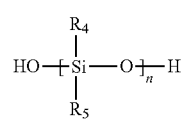   [Formula 2]

In Formula 2, $R^4$ and $R^5$ each independently represent a hydrogen atom or a substituted or unsubstituted monovalent hydrocarbon group, where when a plurality of $R^4$ and $R^5$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present application. That is, basically, all silicone pressure-sensitive adhesives or adhesives known as OCA or OCR, and the like in the industry can be applied in the present application.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion (or cohesion) object is bonded. The liquid pressure-sensitive adhesive or adhesive or curable composition is referred to as a so-called optical clear resin (OCR), which may be cured after the adhesion or cohesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the pressure-sensitive adhesive layer or adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, 9 μm or more, or 10 μm or more, or may also be 45 μm or less, 40 μm or less, 35 μm or less, 30 μm or less, 25 μm or less, 20 μm or less, 15 μm or less, or 10 μm or less or so.

By comprising such an adhesive layer or pressure-sensitive adhesive layer under such arrangement, it is possible to provide a light modulation device that light leakage can be controlled, especially in a black mode, to represent excellent optical properties, while having excellent adhesion (or cohesion).

The side light leakage can be effectively suppressed upon the vertical orientation of the liquid crystal compound and the absorption of front light can be minimized upon the horizontal orientation, by the combination of the orientation of the liquid crystal compound formed by the known vertical alignment film and the adhesive or pressure-sensitive adhesive having vertical orientation ability as such and/or the above-described –C plate, and the like.

In one example of the present application, when the adhesive layer or the pressure-sensitive adhesive layer having vertical orientation force as above is formed on one side of the first polymer film substrate, no liquid crystal alignment film may also be formed on the first polymer film substrate.

The light modulation device of the present application may further comprise a conductive layer on one side of each of the first and second polymer film substrates, as long as the effect of the present application is not obstructed. For example, the conductive layers may be each formed between the adhesive layer or the pressure-sensitive adhesive layer and the first polymer film substrate and between the liquid crystal alignment film and the second polymer film substrate. When the conductive layer is formed, the –C plate may be disposed between the first polymer film substrate and the conductive layer, or between the conductive layer and the pressure-sensitive adhesive layer (or adhesive layer), or between the pressure-sensitive adhesive layer (or adhesive layer) and the light modulation layer and/or may be disposed between the second polymer film substrate and the conductive layer, between the conductive layer and the liquid crystal alignment film, or between the liquid crystal alignment film and the light modulation layer.

In one example, the light modulation device of the present application may represent a structure comprising a first substrate (100) in which a first polarization layer (101), a first polymer film substrate (102), a conductive layer (400a), a –C plate (600) and an adhesive layer or pressure-sensitive adhesive layer (103) are sequentially formed, a light modulation layer (300), and a second substrate (200) in which a liquid crystal alignment film (203), a conductive layer (400b), a second polymer film substrate (202) and a second polarization layer (201) are sequentially formed, as shown in FIG. 5, or the –C plate (600) may be disposed, for example, between the first polymer film substrate (102) and the conductive layer (400a) or may also be disposed between the second polymer film substrate (202) and the conductive layer (400b), without being limited thereto.

The conductive layer may transfer an appropriate electric field to the light modulation layer to switch the alignment of the liquid crystal compound in the light modulation layer. The direction of the electric field may be a vertical or horizontal direction, for example, the thickness direction or the plane direction of the light modulation layer.

The conductive layer may be, for example, a transparent conductive layer, and the transparent conductive layer may be formed by depositing, for example, a conductive polymer, a conductive metal, a conductive nanowire or a metal oxide such as ITO (indium tin oxide), and the like. Besides, various materials and formation methods capable of forming the transparent conductive layer are known, which can be applied without limitation.

Such a light modulation device can be applied to various applications. The applicable application by the light modulation device can be exemplified by openings in closed spaces including buildings, containers or vehicles, such as windows or sunroofs, or eyewear, and the like, or windows and doors, light shielding plates of OLEDs (organic light emitting devices), and the like. Here, in the range of eyewear, all eyewear formed so that an observer can observe the outside through lenses, such as general glasses, sunglasses, sports goggles or helmets, or a wearable device such as an instrument for experiencing virtual reality or augmented reality can be included.

A typical application capable of being applied by the light modulation device of the present application may include a vehicle sunroof.

In one example, as shown in FIG. 14, the light modulation device per se may be a vehicle sunroof. For example, in a vehicle 800 comprising a vehicle body in which at least one or more openings are formed, the light modulation device 700 or the vehicle sunroof mounted on the opening may be mounted and used.

The sunroof is a fixed or operating (venting or sliding) opening on a ceiling of a vehicle, which may mean collectively a device that can function to allow light or fresh air to enter the interior of the vehicle. In the present application, the method of operating the sunroof is not particularly limited, and for example, it can be manually operated or driven by a motor, where the shape, size or style of the sunroof may be appropriately selected according to the intended use. For example, according to the operation method, the sunroof may be exemplified by a pop-up type sunroof, a spoiler (tile & slide) type sunroof, an inbuilt type sunroof, a folding type sunroof, a top-mounted type sunroof, a panoramic roof system type sunroof, a removable roof panels (t-tops or targa roofs) type sunroof or a solar type sunroof, and the like, but is not limited thereto.

An exemplary sunroof of the present application may comprise the light modulation device of the present application, and in this case, as for the details of the light modulation device, the contents described in the items of the light modulation device may be equally applied.

Advantageous Effects

The present application relates to a light modulation device. The present application can provide a light modulation device having excellent optical properties including transmittance-variable characteristics through characteristic control and proper arrangement of a compensation film, and being applicable to various uses by controlling inclination angle light leakage in a black mode.

BEST MODE

Hereinafter, the present application will be described in detail through examples, but the scope of the present application is not limited by the following examples.

Evaluation Example 1. Maximum Value Measurement of Transmittance of Inclination Angles (Including the Front) at the Time of the Black Mode The transmittance of inclination angles (including the front) in the black mode (no voltage applied, 0V) was measured using a haze meter (NDH5000SP, Sekos) according to ASTM D1003 standard.

Specifically, when light with a wavelength of 380 nm to 780 nm is incident on the measurement object in the integrating sphere, the incident light is divided into diffused light (DT, sum of the entire diffused and emitted light) and straight light (PT, light emitted from the front direction excluding diffused light) by the measurement object. The diffused light and the straight light can each be measured by condensing them on the light receiving element in the integrating sphere. That is, by the above process, the total transmitted light (TT) can be defined as the sum (DT+PT) of the diffused light (DT) and the straight light (PT). The total transmitted light means total transmittance.

The maximum values of the transmittance of the inclination angles (including the front) in the black mode (0V) for the light modulation devices of Examples and Comparative Examples were set to the largest values among the values obtained by measuring the omnidirectional transmittance with respect to the front and inclination angles without applying voltage to the light modulation devices. While the z-axis direction as the normal direction of the reference plane of the measurement object (for example, the reference plane may be a surface of a polarization layer, a polymer film substrate, a light modulation layer, a −C plate, an adhesive layer (or a pressure-sensitive adhesive layer) or a liquid crystal alignment film, and the like in a light modulation device) was set to 0 degrees and the radial angles Φ of FIG. 6 were changed to 0 degrees, 30 degrees, 60 degrees, 90 degrees, 120 degrees, 150 degrees, 180 degrees, 210 degrees, 240 degrees, 270 degrees, 300 degrees and 330 degrees with regard to each of −60 degrees, −45 degrees, −30 degrees, −15 degrees, 0 degrees (front), 15 degrees, 30 degrees, 45 degrees and 60 degrees (the inclination angles Θ in FIG. 6), the measured results for Examples 1 to 4 were depicted in FIGS. 8 to 11 and those for Comparative Examples 1 to 2 were depicted in FIGS. 12 and 13 (horizontal axis means radial angles Φ, vertical axis means transmittance (%), and the line of each graph indicates the value measured at a specific inclination angle Θ), and among them, the largest values were shown in Table 1.

Evaluation Example 2. Planar Phase Difference Evaluation of Polymer Film Substrate The planar phase difference (Rin) of the polymer film was measured using Agilent's UV/VIS spectroscope 8453 equipment (based on a wavelength of 550 nm). Two sheets of polarizers were installed in the UV/VIS spectroscope so that their transmission axes were orthogonal to each other, and a polymer film was positioned between the two sheets of polarizers so that its slow axis formed 45 degrees with the transmission axes of the two polarizers, respectively, and then the transmittance according to wavelengths was measured. The phase retardation order of each peak was obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the $R_{in}$ value for light having a wavelength of 550 nm.

$T = \sin 2[(2\pi R/\lambda)]$                  [Equation A]

$T = \sin 2[((2n+1)\pi/2)]$             [Equation B]

$n = (\lambda n - 3\lambda n + 1)/(2\lambda n + 1 + 1 - 2\lambda n)$         [Equation C]

Here, R means a planar phase difference (Rin), λ means a wavelength, and n means a nodal degree of a sine waveform.

Evaluation Example 3. Thickness of Light Modulation Layer

The thickness of the light modulation layer coincided with the height of the spacer, and the height of the spacer was confirmed using a measuring device (Optical Profiler, Nano System, Nano View-E1000).

Evaluation Example 4. Evaluation of Refractive Index Anisotropy and Average Refractive Index of Light Modulation Layer (Liquid Crystal Layer) or −C Plate The refractive index anisotropy (Δn) and average refractive index of the light modulation layer or the −C plate are evaluated in the following manner using an Abbe refractometer. In the case of the light modulation layer, by coating a vertical alignment film on the measuring prism and illumination prism surfaces of the Abbe refractometer and coating a liquid crystal compound to be measured on the measuring prism and then covering it with the illumination prism, the liquid crystal compound is vertically oriented by the vertical orientation force. The liquid crystal compound applied in the above process is only the liquid crystal compound, which is applied to the light modulation layer, without mixing with other materials such as dichroic dye. Also, in the case of the −C plate, it is measured by applying or attaching a −C plate material on the measuring prism and illumination prism surfaces of the Abbe refractometer and then covering it with the illumination prism.

Then, as shown in FIG. 7, when a linear polarizer is applied to the eyepiece side (grounded) and irradiated with light to be observed, $\theta_e$ and $\theta_o$ as shown in FIG. 7 can be obtained and the extraordinary refractive index ($n_e = n_p \sin \theta_e$) and the ordinary refractive index ($n_o = n_p \sin \theta_o$) can be obtained through the refractive index ($n_p$) of the measuring prism and the angles ($\theta_e$ and $\theta_o$). Here, the difference ($n_e - n_o$) may be defined as the refractive index anisotropy, and the average value (($n_e + n_o$)/2) may be defined as the average refractive index. The reference wavelength upon measurement is approximately 550 nm.

Example 1

As first and second polymer film substrates, a device was manufactured using a stretched PET (polyethylene terephthalate) film substrate (thickness: 145 µm, manufacturer: SKC). The PET film substrate had a planar phase difference of about 10,000 nm to 15,000 nm for light with a wavelength of 550 nm.

First, an ITO (indium tin oxide) film (conductive layer) was deposited on one side of the first PET film substrate, and a −C plate material was bar-coated on the ITO film and then cured at about 100° C. for 20 minutes to form the −C plate with a thickness of about 6 µm. The thickness direction phase difference of the −C plate was approximately −720 nm or so for light having a wavelength of 550 nm, and the average refractive index was 1.65. Here, the −C plate material was prepared by blending a polyamide, in which terephthalic acid, isophthalic acid and 2,2'-bis(trifluoromethyl)-4,4'-biphenyldiamine were polymerized, in a ratio of approximately 5.3 wt % relative to a dimethylacetamide solution.

Subsequently, a silicone pressure-sensitive adhesive (Shinetsu, KR3700) was bar-coated on the −C plate and then cured at about 100° C. for 100 minutes to form a pressure-sensitive adhesive layer having a thickness of about 10 µm (first substrate).

First, an ITO (indium tin oxide) film (conductive layer) was deposited on one side of the second PET film substrate, and spacers (pitch: 350 µm, height: 8 µm, line width: 16 µm, area ratio: 9%) in the form of a square partition for maintaining a cell gap were formed on the ITO film. Thereafter, a polyimide-based vertical alignment film (SE-5661LB3, Nissan) having a thickness of approximately 100 nm was formed for initial orientation control of the light modulation layer (liquid crystal layer), and then subjected to rubbing with a rubbing cloth. At this time, the rubbing direction was set to be horizontal to the slow axis of the lower PET film substrate (second substrate).

Subsequently, the pressure-sensitive adhesive layer of the first substrate and the alignment film of the second substrate were disposed to face each other (cell gap: 8 µm), and a liquid crystal material was injected therein, and then a device was manufactured through a lamination process. As the liquid crystal material, a composition that a chiral dopant (S811, Merck) was mixed with a liquid crystal compound (SHN-7002XX T12, JNC) having negative dielectric constant anisotropy with a refractive index anisotropy (Δn) of approximately 0.094 and an average refractive index of 1.58 was used. At this time, about 0.5 parts by weight of the chiral dopant was mixed with respect to 100 parts by weight of the liquid crystal compound, so that the chiral pitch was approximately 20 µm or so. In addition, the thickness direction phase difference of the light modulation layer thus formed was approximately 752 nm or so for light having a wavelength of 550 nm.

Subsequently, a first polarization layer was attached to the surface of the first PET film substrate on which the ITO film (conductive layer) was not formed, and a second polarization layer was attached to the surface of the second PET film substrate on which the ITO film (conductive layer) was not formed. As the first and second polarization layers, a general PVA polarization layer prepared through high temperature/stretching by adsorbing iodine on a PVA film was used.

The arrangement was performed so that the slow axis direction of the first and second polymer film substrates and the absorption axis of the first polarization layer were parallel to each other, and the absorption axis of the second polarization layer was perpendicular to the absorption axis of the first polarization layer.

As a result, the light modulation device having the structure of the first polarization layer/first PET film substrate/ITO film/−C plate/adhesive layer/light modulation layer (liquid crystal layer)/alignment film/ITO film/second PET film substrate/second polarization layer was formed.

Example 2

A light modulation device was manufactured in the same manner as in Example 1, except that the −C plate, the ITO film and the adhesive layer were sequentially formed on one side of the first PET film substrate upon producing the first substrate. As a result, the light modulation device having the structure of the first polarization layer/first PET film substrate/−C plate/ITO film/adhesive layer/light modulation layer (liquid crystal layer)/alignment film/ITO film/second PET film substrate/second polarization layer was formed.

Example 3

A light modulation device was manufactured in the same manner as in Example 1, except that the −C plate was not formed between the ITO film and the adhesive layer of the first substrate, and was formed between the second polymer substrate and the ITO film of the second substrate. As a result, the light modulation device having the structure of the first polarization layer/first PET film substrate/ITO film/adhesive layer/light modulation layer (liquid crystal layer)/alignment film/ITO film/−C plate/second PET film substrate/second polarization layer was formed.

Example 4

A light modulation device was manufactured in the same manner as in Example 2, except that when the pressure-sensitive adhesive layer of the first substrate and the alignment film of the second substrate were disposed to face each other, they were disposed so that the cell gap was 6 µm (the height of the spacer was also 6 µm), and the thickness direction phase difference of the light modulation layer was approximately 564 nm for light with a wavelength of 550 nm and the thickness direction phase difference of the −C plate was approximately −540 nm or so for light with a wavelength of 550 nm. As a result, the light modulation device having the structure of the first polarization layer/first PET film substrate/−C plate/ITO film/adhesive layer/light modulation layer (liquid crystal layer)/alignment film/ITO film/second PET film substrate/second polarization layer was formed.

Comparative Example 1

A light modulation device was manufactured in the same manner as in Example 1, except that the −C plate was not introduced.

As a result, the light modulation device having the structure of the first polarization layer/first PET film substrate/ITO film/adhesive layer/light modulation layer (liquid crystal layer)/alignment film/ITO film/second PET film substrate/second polarization layer was formed.

Comparative Example 2

A light modulation device was manufactured in the same manner as in Example 1, except that the −C plate was disposed between the first polarization layer and the first PET film substrate.

As a result, the light modulation device having the structure of the first polarization layer/−C plate/first PET film substrate/ITO film/adhesive layer/light modulation layer (liquid crystal layer)/alignment film/ITO film/second PET film substrate/second polarization layer was formed.

TABLE 1

| Classification | Maximum value of inclination angle (front) transmittance in black mode (0 V) |
|---|---|
| Example 1 | 6.92% |
| Example 2 | 6.34% |
| Example 3 | 6.61% |
| Example 4 | 5.22% |
| Comparative Example 1 | 17.27% |
| Comparative Example 2 | 14.32% |

In Table 1 above, the maximum values of the transmittance of the inclination angles (including the front) in the black mode (0V) represent the largest values among the transmittance values measured while the z-axis direction as the normal direction of the reference plane of the measurement object (for example, the reference plane may be a surface of a polarization layer, a polymer film substrate, a light modulation layer, a −C plate, an adhesive layer (or a pressure-sensitive adhesive layer) or a liquid crystal alignment film, and the like in a light modulation device) is set to 0 degrees and the radial angles Φ of FIG. 6 are changed to 0 degrees, 30 degrees, 60 degrees, 90 degrees, 120 degrees, 150 degrees, 180 degrees, 210 degrees, 240 degrees, 270 degrees, 300 degrees and 330 degrees with regard to each of −60 degrees, −45 degrees, −30 degrees, −15 degrees, 0 degrees (front), 15 degrees, 30 degrees, 45 degrees and 60 degrees (the inclination angles Θ in FIG. 6). As a result, it could be confirmed that the inclination angle (including the front) light leakage of the light modulation devices of Examples 1 to 4 was smaller than that of the light modulation devices of Comparative Examples 1 and 2.

The invention claimed is:

1. A light modulation device, comprising:
a first polymer film substrate having a first surface and a second surface,
an adhesive layer or pressure-sensitive adhesive layer disposed on the first surface of the first polymer film substrate;
a second polymer film substrate having a first surface and a second surface;
a liquid crystal alignment film disposed on the first surface of the second polymer film substrate;
a −C plate; and
a light modulation layer containing a liquid crystal compound,
wherein the first and second polymer film substrates are disposed so that the first surfaces face each other, the first and second polymer film substrates each have a planar phase difference of 500 nm or more at a wavelength of 550 nm, the light modulation layer is present between the first and second polymer film substrates, and the −C plate is present between the light modulation layer and the first polymer film substrate or between the light modulation layer and the second polymer film substrate.

2. The light modulation device according to claim 1, wherein the −C plate has an absolute value (C) of a thickness direction phase difference satisfying Condition 1 below and the thickness direction phase difference of the −C plate is a negative value:

$$C \leq D \times 1.2 \quad \text{[Condition 1]}$$

wherein, D is a value determined by a thickness direction phase difference of the light modulation layer in a vertical orientation statex(an average refractive index of the liquid crystal compound included in the light modulation layer/an average refractive index of the −C plate).

3. The light modulation device according to claim 1, further comprising:
a partition-shaped spacer that maintains an interval between the first and second polymer film substrates.

4. The light modulation device according to claim 3, wherein the partition-shaped spacer has a shape of a tetragonal, triangular or honeycomb partition.

5. The light modulation device according to claim 3, wherein the partition-shaped spacer comprises a curable resin.

6. The light modulation device according to claim 1, further comprising:
a first polarization layer attached to the second surface of the first polymer film substrate; and
a second polarization layer attached to the second surface of the second polymer film substrate,
wherein absorption axes of the first and second polarization layers are perpendicular to each other.

7. The light modulation device according to claim 1, wherein slow axes of the first and second polymer film substrates are parallel to each other.

8. The light modulation device according to claim 6, wherein slow axes of the first and second polymer film substrates are parallel to each other, and an angle formed by the slow axes and the absorption axis of one of the first and second polarization layers is perpendicular, and an angle formed by the slow axes and the absorption axis of the other of the first and second polarization layers is parallel.

9. The light modulation device according to claim 1, wherein an initial orientation state of the liquid crystal compound in the light modulation layer is a vertical orientation state.

10. The light modulation device according to claim 9, wherein the vertical orientation state can be changed to a horizontal orientation state by application of an external signal.

11. The light modulation device according to claim 1, wherein the light modulation layer further comprises a chiral dopant.

12. The light modulation device according to claim 11, wherein a ratio of a thickness (d) of the light modulation layer to a chiral pitch (p) formed by the chiral dopant is less than 1.

13. The light modulation device according to claim 1, wherein the pressure-sensitive adhesive or adhesive is a silicone pressure-sensitive adhesive or adhesive.

14. The light modulation device according to claim 1, wherein conductive layers are disposed between the adhesive layer or pressure-sensitive adhesive layer and the first polymer film substrate and between the liquid crystal alignment film and the second polymer film substrate.

15. The light modulation device according to claim 1, wherein no liquid crystal alignment film is formed on the first polymer film substrate.

16. A vehicle comprising:
a vehicle body in which one or more openings are formed; and
the light modulation device of claim 1 mounted on the openings.

* * * * *